US012350800B2

(12) United States Patent
Kochie et al.

(10) Patent No.: US 12,350,800 B2
(45) Date of Patent: Jul. 8, 2025

(54) SLIDE HAMMER

(71) Applicant: Robert Bosch GmbH, Stuttgart (DE)

(72) Inventors: Robert Kochie, Dodge Center, MN (US); Daniel Newkirk, Owatonna, MN (US)

(73) Assignee: Robert Bosch GmbH, Stuttgart (DE)

( * ) Notice: Subject to any disclaimer, the term of this patent is extended or adjusted under 35 U.S.C. 154(b) by 318 days.

(21) Appl. No.: 18/058,430

(22) Filed: Nov. 23, 2022

(65) Prior Publication Data

US 2023/0211485 A1 Jul. 6, 2023

Related U.S. Application Data

(60) Provisional application No. 63/295,097, filed on Dec. 30, 2021.

(51) Int. Cl.

*B25D 1/16* (2006.01)
*B25G 1/01* (2006.01)
*B25B 27/00* (2006.01)

(52) U.S. Cl.

CPC ................. *B25D 1/16* (2013.01); *B25G 1/01* (2013.01); *B25B 27/0035* (2013.01)

(58) Field of Classification Search

CPC .. B25D 1/12; B25D 1/16; B25G 1/102; B66F 15/00

See application file for complete search history.

(56) References Cited

U.S. PATENT DOCUMENTS

| | | | | | |
|---|---|---|---|---|---|
| 3,169,010 | A * | 2/1965 | Crawford, Jr. | B25C 11/02 | 254/19 |
| 4,476,861 | A * | 10/1984 | Dimakos | A61B 17/92 | 606/100 |
| 5,245,737 | A * | 9/1993 | Perea | B25D 1/16 | 29/247 |
| 5,251,368 | A | 10/1993 | Somerville et al. | | |
| 6,035,946 | A * | 3/2000 | Studley | A62B 3/005 | 173/90 |
| 8,069,544 | B2 * | 12/2011 | Sollami | B25D 1/16 | 29/254 |
| 10,611,008 | B2 * | 4/2020 | Pugliese | B25B 27/28 | |
| 10,660,656 | B2 * | 5/2020 | Purdy | A61B 17/1671 | |
| 11,219,990 | B2 * | 1/2022 | Tsai | B25B 27/023 | |
| D962,736 | S * | 9/2022 | Tsai | D8/55 | |

(Continued)

FOREIGN PATENT DOCUMENTS

IT 102021000031310 12/2021

OTHER PUBLICATIONS

OTC—Slide Hammer Puller Sets (2 pages).
OTC—Silver Slapper (3 pages).

*Primary Examiner* — Lee D Wilson
(74) *Attorney, Agent, or Firm* — David Kovacek; Maginot, Moore & Beck LLP

(57) ABSTRACT

Slide hammer comprising: a shank and a weight, the weight being slidably arranged on the shank, the shank having a tool attachment section at a first axial end and a handle at a second axial end opposite from the first axial end, the handle extending away from the shank on at least a first radial side of the shank, wherein the handle comprises at least a first grip on the first radial side of the shank, wherein the at least first grip is attached to the shank with a shaft, and wherein the shaft is arranged in a bore extending longitudinally within the at least on grip.

10 Claims, 1 Drawing Sheet

(56) References Cited

U.S. PATENT DOCUMENTS

| | | | | |
|---|---|---|---|---|
| 2012/0228568 | A1 * | 9/2012 | Leon | B25F 1/006 254/21 |
| 2021/0277674 | A1 | 9/2021 | Weaver, IV | |

* cited by examiner

SLIDE HAMMER

TECHNICAL FIELD

This disclosure relates generally to a slide hammer. More particularly, the present disclosure relates to a slide hammer for servicing components such as vehicle components, for example, wheel hubs, brake drums and brake rotors.

BACKGROUND

One versatile tool which has a slide hammer and several pulling attachments to give a user various methods for pulling, maintenance, and repair applications is the OTC Silver Slapper 8-Way Slide Hammer Puller Set, SKU: 1179 (www.otctools.com/produces/silver-slapper-8-way-slide-hammer-puller-set). The Silver Slapper's slide hammer exerts force when needed. A slide hammer typically has a simple round, straight T-handle integrated into the slide hammer shank. While operating the slide hammer, it is many times necessary to apply pulling pressure to the handle. This can be very uncomfortable due to the shock from the hammer action.

SUMMARY

One aspect of this disclosure is directed to a slide hammer comprising: a shank and a weight. The weight is slidably arranged on the shank. The shank has a tool attachment section at a first axial end and a handle at a second axial end opposite from the first axial end. The handle extends away from the shank on at least one radial side of the shank. The handle comprises at least a first grip on the first radial side of the shank. The at least first grip is attached to the shank with a shaft. The shaft is arranged in a bore extending longitudinally within the at least on grip.

In some embodiments, the handle comprises a second grip on a second radial side of the shank across from the first radial side, wherein the first grip and the second grip are attached to the shank with the shaft that extends through a cross bore in the shank. The first and second grip may be identical or different from each other.

In some embodiments, the bore is stepped with a first section extending from a first axial end face facing the shank into the grip and with a second section extending from a second axial end face facing away from the shank into the grip, wherein the first section has a smaller diameter than the second section and wherein an annular shoulder radially extends between the first section and the second section.

In some embodiments, the shaft and the at least first grip are removably attached to the shank. The shaft, for example, may be threadedly attached to the shank and clamps the grip against the shank.

In some embodiments, the shaft is a bolt comprising a head, a thread opposite from the head and a nut, wherein the head abuts against the annular shoulder of the first grip and the nut abuts against the annular shoulder of the second grip. The second section of the bore may be longer than the height of the head and the height of the nut.

In some embodiments, the at least first grip has a first axial end face abutting the shank and a second axial end face opposite from the first axial end face, and wherein the first axial end face has a groove extending across the first axial end face and parallel to the axial extension of the shank and wherein a section of the radial side surface of the shank is arranged in the groove. The groove may have a bottom and side surfaces on either side of the bottom, wherein the side surfaces are from the group consisting of flat and rounded side surfaces, wherein flat side surfaces are each abutting the shank along a line and rounded side surfaces have a radius that corresponds to the radius of the shank where the grips are attached.

In some embodiments, the outside of the at least first grip along its longitudinal axis has a first outside section adjacent to the shank and a second outside section away from the shank, and wherein the first and second outside sections have the shape of a concave cylinder. The first and second outside sections may have a minimum diameter which is bigger than a diameter of the shank where the grips are attached.

The above aspects of this disclosure and other aspects will be explained in greater detail below with reference to the attached drawings.

DETAILED DESCRIPTION

The illustrated embodiment is disclosed with reference to the drawings. However, it is to be understood that the disclosed embodiment is intended to be merely an example that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
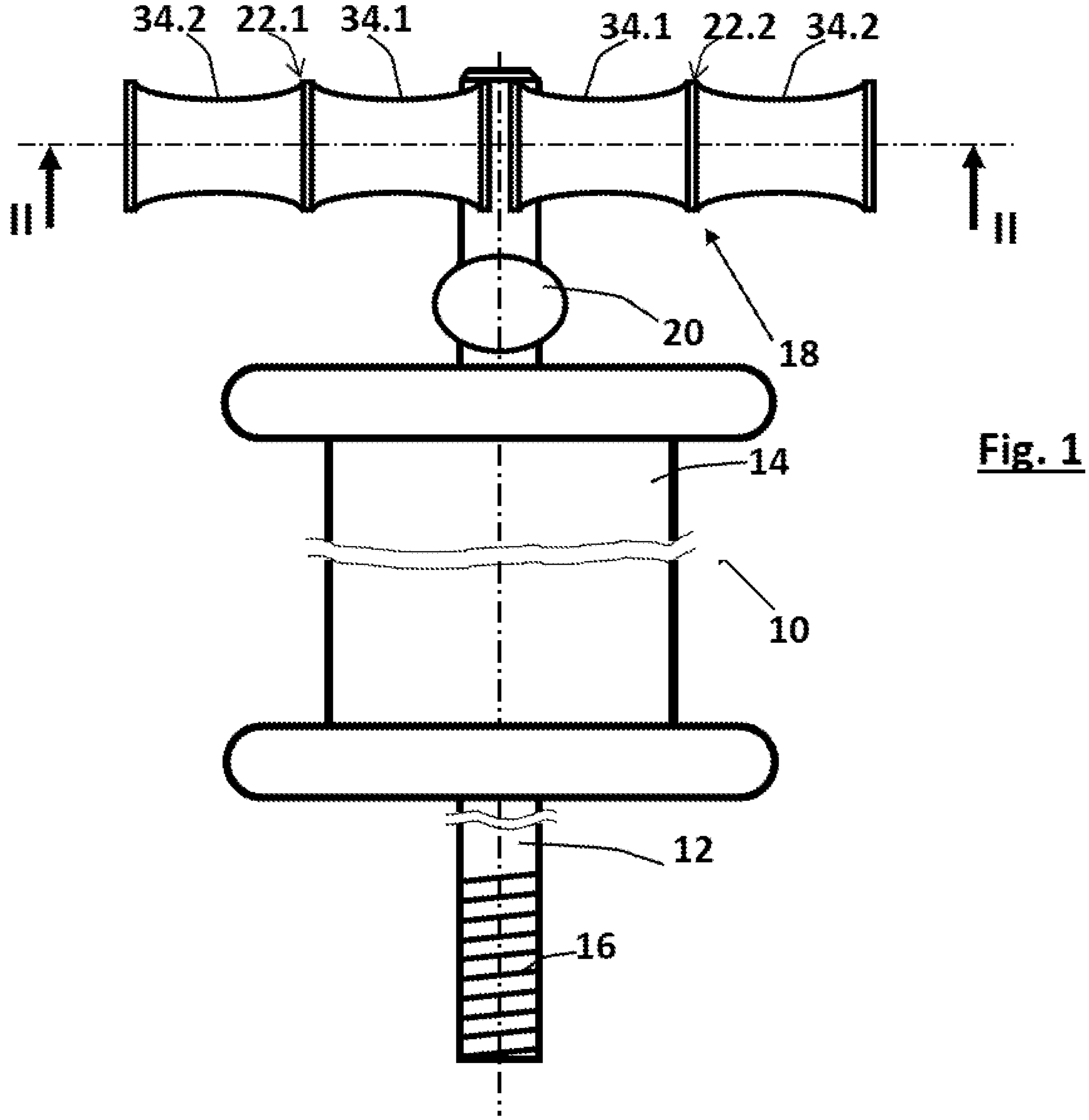
FIG. 1 is a front view of a slide hammer.
Figure 2:
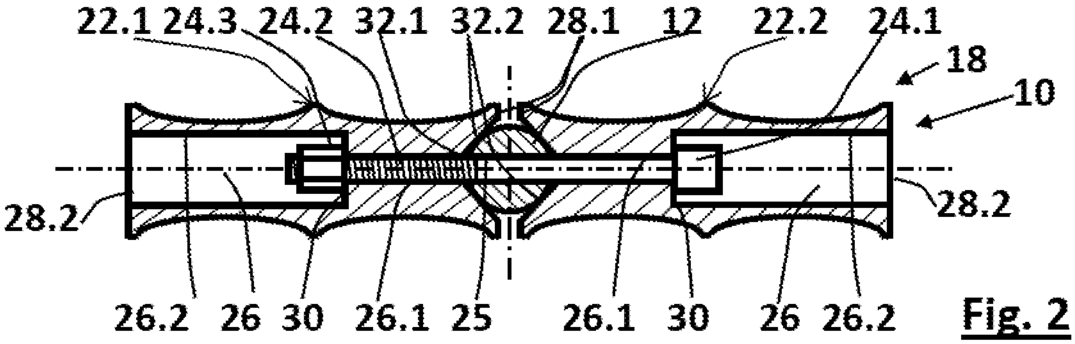
FIG. 2 is a cross section along the line II-II in FIG. 1.

FIGS. 1 and 2 illustrate a slide hammer 10 comprising a shank 12 and a weight 14, sometimes also called the hammer. The weight 14 is slidably arranged on the shank 12. The slide hammer 10 has a tool attachment section 16 at a first axial end of the shank 12. The tool attachment section 16 may be a threaded portion of the shank 12 as shown. The slide hammer 10 has a handle 18 arranged at a second axial end of the shank 12, opposite from the first axial end. The shank 12 has a stop 20 for the weight 14 close to the handle 18. The handle 18 extends away from the shank 12 on either radial side of the shank 12. The handle 18 comprises a first grip 22.1 on one radial side of the shank 12 and a second grip 22.2 on the other radial side of the shank 12. The grips 22.1, 22.2 may be identical or different from each other.

The first grip 22.1 and the second grip 22.2 are attached to the shank 12 with a bolt 24 but may also be attached with a different form of a shaft. The bolt 24 is arranged in a cross bore 25 of the shank 12 and in bores 26 extending longitudinally within the grips 22.1, 22.2. Each bore 26 is stepped with a first section 26.1 extending from a first axial end face 28.1 facing the shank 12 into the grip 22.1, 22.2 and with a second section 26.2 extending from a second axial end face 28.2 facing away from the shank 12 into the grip 22.1, 22.2. The first section 26.1 has a smaller diameter than the second section 26.2. An annular shoulder 30 radially extends between first section 26.1 and the second section 26.2.

The bolt 24 comprises a head 24.1, a thread 24.2 opposite from the head 24.1 and a nut 24.3. The head 24.1 abuts against the annular shoulder 30 of the first grip 22.1 and the nut 24.3 abuts against the annular shoulder 30 of the second grip 22.2. The second section 26.2 of the bore 26 is longer than the height of the head 24.1 and the height of the nut 24.3. This allows for the head 24.1 and nut 24.3 to be fully arranged within the sections 26.2.

As mentioned above, each grip 22.1, 22.2 has a first axial end face 28.1 opposite from the second axial end face 28.2. The first axial end face 28.1 abuts the shank 12. The first axial end face 28.1 has a groove 32 extending across the first axial side 28.1 and parallel to the axial extension of the shank 12 in which a side surface of the shank 12 is arranged. The groove 32 has a bottom 32.1 and side surfaces 32.2 on either side of the bottom 32.1. The side surfaces 32.2 are flat and abut the shank 12 along a line each. The side surfaces may also be rounded and may have a radius that corresponds to the radius of the shank 12 where the grips 22.1, 22.2 are attached.

Each grip 22.1, 22.2, on its outside, has a first outside section 34.1 adjacent to the shank 12 and a second outside section 34.2 away from the shank 12. The first and second outside sections 34.1, 34.2 have the shape of a concave cylinder. The first and second outside sections 34.1, 34.2 have a minimum diameter which is bigger than a diameter of the shank 12 where the grips 22.1, 22.2 are attached. The increased diameter of the handle 18 through the grips 22.1, 22.2 and the concave or cupped design allow for a better form fit for the fingers, both targeting reducing shock and stress on the fingers. In operation, a user may pull on the handle with four fingers, one in a concave portion of the grips 22.1, 22.2. The outside sections 34.1, 34.2 may be covered in a shock absorbing material, such as polymer or rubber, to absorb the impact from the weight 14 when it is pushed against the stop 20.

Instead of two grips 22.1, 22.2 one grip may be used. That grip could get fastened with the bolt 24 and its nut 24.3. There may also be a threaded cross bore in the shank 12 to fasten one grip which extends away from the shank 12. This may allow the use of the slide hammer 10 in a tighter space. The grips 22.1, 22.2 allow for an increased diameter of the handle 18 and also for a better form fit for the fingers. Both may reduce shock and stress on the fingers. This may also reduce finger/hand stress when applying a twisting motion to the shank 12. The use of the bolt 24 allows for a modular design as one or both grips 221, 22.2 may be used. The ability to detach the grips 22.1, 22.2 also reduces the radial space needed to store the slide hammer 10.

What is claimed is:

1. A Slide hammer comprising: a shank and a weight, the weight being slidably arranged on the shank, the shank having a tool attachment section at a first axial end and a handle at a second axial end opposite from the first axial end, the handle extending away from the shank on at least a first radial side of the shank, wherein the handle comprises at least a first grip on the first radial side of the shank, wherein the at least first grip is attached to the shank with a shaft, and wherein the shaft is arranged in a bore extending longitudinally within the at least on grip, and wherein the bore is stepped with a first section extending from a first axial end face facing the shank into the grip and with a second section extending from a second axial end face facing away from the shank into the grip, wherein the first section has a smaller diameter than the second section and wherein an annular shoulder radially extends between the first section and the second section.

2. The slide hammer according to claim 1, wherein the handle comprises a second grip on a second radial side of the shank across from the first radial side, wherein the first grip and the second grip are attached to the shank with the shaft that extends through a cross bore in the shank.

3. The slide hammer according to claim 2, wherein the first and second grip are identical.

4. The slide hammer according to claim 1, wherein the shaft and the at least first grip are removably attached to the shank.

5. The slide hammer according to claim 4, wherein the shaft is threadedly attached to the shank and clamps the grip against the shank.

6. The slide hammer according to claim 2, wherein the bore is stepped with a first section extending from a first axial end face facing the shank into the grip and with a second section extending from a second axial end face facing away from the shank into the grip, wherein the first section has a smaller diameter than the second section and wherein an annular shoulder radially extends between the first section and the second section, wherein the shaft is a bolt comprising a head, a thread opposite from the head and a nut, and wherein the head abuts against the annular shoulder of the first grip and the nut abuts against the annular shoulder of the second grip.

7. The slide hammer according to claim 6, wherein the second section of the bore is longer than the height of the head and the height of the nut.

8. A Slide comprising: a shank and a weight, the weight being slidably arranged on the shank, the shank having a tool attachment section at a first axial end and a handle at a second axial end opposite from the first axial end, the handle extending away from the shank on at least a first radial side of the shank, wherein the handle comprises at least a first grip on the first radial side of the shank, wherein the at least first grip is attached to the shank with a shaft, and wherein the shaft is arranged in a bore extending longitudinally within the at least on grip, wherein, extending longitudinally along the outside of the at least first grip, the at least first grip has a first outside section adjacent to the shank and a second outside section away from the shank, wherein the first and second outside sections have the shape of a concave cylinder, and wherein the at least first grip has a first axial end face abutting the shank and a second axial end face opposite from the first axial end face, and wherein the first axial end face has a groove extending across the first axial end face and parallel to the axial extension of the shank and wherein a section of the radial side surface of the shank is arranged in the groove, wherein the groove has a bottom and side surfaces on either side of the bottom, wherein the side surfaces are from the group consisting of flat and rounded side surfaces, wherein flat side surfaces are each abutting the shank along a line and rounded side surfaces have a radius that corresponds to the radius of the shank where the grips are attached.

9. The slide hammer according to claim 8, wherein the first and second outside sections have a minimum diameter which is bigger than a diameter of the shank where the grips are attached.

10. The slide hammer according to claim 1, wherein the outside of the at least first grip is covered with a shock absorbing material.

* * * * *